May 26, 1925.
F. M. FICHTEN
TRACTION LUG
Filed Oct. 9, 1923
1,539,387
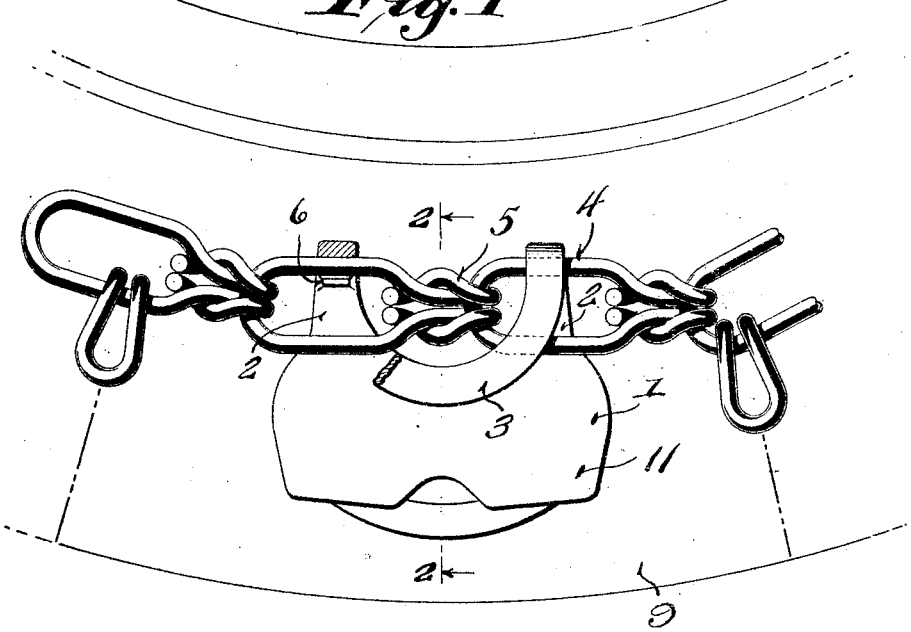
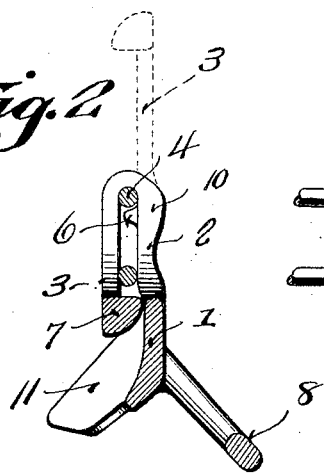
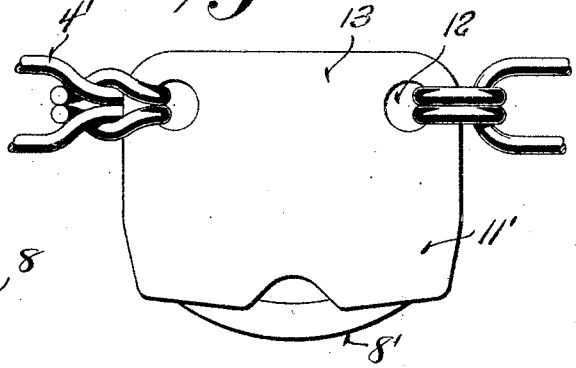

Patented May 26, 1925.

1,539,387

UNITED STATES PATENT OFFICE.

FRANK M. FICHTEN, OF DAVENPORT, IOWA.

TRACTION LUG.

Application filed October 9, 1923. Serial No. 667,469.

*To all whom it may concern:*

Be it known that I, FRANK M. FICHTEN, a citizen of the United States, and resident of Davenport, in the county of Scott and State of Iowa, have invented certain new and useful Improvements in Traction Lugs; and I do hereby declare that the following is a full, clear, and exact description thereof.

This invention relates to traction lugs which are adapted to be used in connection with any of the usual anti-skid chains for automobiles.

This invention is an improvement over that disclosed in my Patent No. 1,416,806 for traction lugs dated March 23, 1922, and has in general the same objects as those disclosed in such patent.

Further objects of this invention are to provide a traction lug which may be manufactured as a separate article or as a permanent attachment for the chain, to provide a traction lug which may be readily applied to the anti-skid chain and which, after being applied thereto, will form a permanent portion of the anti-skid chain, and to provide a traction lug which will compact the soft ground adjacent the wheels of an automobile and secure a firm grip thereon.

Further objects are to provide a traction lug which may be cheaply manufactured, which may be readily applied, which will retain its correct position relative to the anti-skid chain, and which is of rugged and substantial construction.

Embodiments of the invention are shown in the accompanying drawings, in which:—

Figure 1 is a side elevation partly in section showing the lug in position upon the anti-skid chain.

Figure 2 is a sectional view on the line 2—2 of Figure 1.

Figure 3 is a view of a modified form.

The lug comprises a body portion 1 from which a pair of arms 2 project. These arms are joined by a curved approximately semicircular member 3, which, in the finished form, is folded over the longitudinal links 4 of the anti-skid chain with the enlarged joint 5 of such chain located between the arms 2, as shown in Figure 1. It is preferable to provide inwardly projecting lugs 6 on the arms 2 which engage the upper strand of the links, as shown in Figures 1 and 2, and aid in maintaining the correct position of the lug. If desired, the outer portion of the member 3 may be provided with a lug 7 (see Figure 2) which will further aid in retaining the traction lug in position.

The body portion 1 is provided with an inwardly directed arcuate member 8 which conforms approximately to the tire 9 so that the lug may lie closely adjacent the tire, as illustrated in Figure 1. If desired, an enlargement or projection 10 may be formed upon the arms 2, as shown in Figure 2, to further rock or direct the lug into the position shown in Figure 2 when it is in its normal or active position—such projection 10 contacting with the tire and aiding in holding the lug in this position. The body portion is further provided with an outwardly projecting relatively flared or curved portion 11 which forms in effect a spur or wing. The member 11 compacts the soft ground adjacent the tire and causes the device to secure a firm grip upon the ground and to prevent either spinning of the wheel or lateral slipping.

In Figure 3 a further form of the invention is shown in which the chains 4' directly engage, by means of apertures 12, the inner portion 13 of the traction lug. This traction lug is similarly provided with an outwardly projecting portion 11' and with the inwardly directed arcuate member 8', as in the form previously described.

In using the devices, obviously, they may be applied to the chains by the manufacturer, if desired, or in fact, they may be applied by the purchaser if it is found expedient. As shown in dotted lines in Figure 2, the forged traction lug is initially formed with the member 3 projecting. This member is folded downwardly over the chain and forced into position in the full line position.

I may find it desirable, if the device is to be applied by the purchaser, to partially fold the member 3, thereby making it a relatively simple operation for the purchaser to hammer the member 3 into its final position.

It will be seen that a traction lug has been provided which may be readily constructed, which is of substantial and strong design, which may be readily applied, and which is effective in operation.

Although a few forms of the invention have been described in considerable detail, it is to be understood that the invention may be variously embodied and is, therefore, to be limited only as claimed.

I claim:

1. A traction lug adapted to be permanently applied to anti-skid chains for automobile tires comprising a body portion, a pair of arms projecting from said body portion, a member joining said arms and folded over said chains, means projecting inwardly from said body portion and adapted to lie against the outer face of said tire, and a flared member projecting outwardly from said body portion and angularly arranged with reference to said first mentioned member.

2. A traction lug for permanent attachment to anti-skid chains for automobile tires, such traction lug comprising a body portion having divergent members one of which is adapted to lie against said tire, a pair of arms extending from said body portion, means joining said arms and folded over said anti-skid chains, and lugs carried by said arms for engaging said chains.

3. The combination of anti-skid chains for automobile tires and a traction lug permanently attached to said chains and comprising a body portion having inwardly and outwardly projecting portions, one of said portions adapted to lie against the side of said tire, and the other of said portions being an elongated flared apron-like member, a pair of arms extending from said body portion, a member integrally joining said arms and folded over said chain, and a lug carried by said member and adapted to lap beneath said chain.

In testimony that I claim the foregoing I have hereunto set my hand at Davenport, in the county of Scott and State of Iowa.

FRANK M. FICHTEN.